UNITED STATES PATENT OFFICE.

GEORGE T. WRIGHT AND LAURENCE C. HODSON, OF AMES, IOWA, ASSIGNORS TO CONSOLIDATED CHEMICAL PRODUCTS COMPANY, OF DES MOINES, IOWA, A CORPORATION OF DELAWARE.

PROCESS FOR THE SEPARATION OF ORES AND METALS.

1,238,242.      Specification of Letters Patent.      Patented Aug. 28, 1917.

No Drawing.      Application filed July 27, 1916. Serial No. 111,647.

*To all whom it may concern:*

Be it known that we, GEORGE T. WRIGHT and LAURENCE C. HODSON, citizens of the United States, residing at Ames, in the county of Story and State of Iowa, have invented new and useful Improvements in Processes for the Separation of Ores and Metals, of which the following is the specification.

The object of our invention is to provide a method of treatment of zinc ores, so contaminated with barytes, barite, barium sulfate or tiff as to be unamenable to treatment by smelters, and therefore practically unmarketable, and at the same time to render the barytes, barite, barium sulfate, which when mixed with the zinc ores is worthless and renders the zinc ores also worthless, a valuable by-product.

Large quantities of zinc ores are found in combination with barium, generally in the form of sulfate, the zinc being in the form of zinc sulfid, oxid, silicates and carbonates, the specific gravity of the zinc ore and the barium compound being practically the same.

All commercially feasible methods heretofore attempted, in so far as we are aware, of making a mechanical separation of the zinc ore and the barite, barytes, barium sulfate have proved failures, though repeated attempts at making such separation by means of flotation processes, electrostatic processes, McQuistion tubes, and the like, have been attempted.

Our invention contemplates a combination of mechanical and chemical operations, whereby, by a chemical treatment the mechanically inseparable and valueless combination of ores is made separable and separably salable.

Other objects and advantages of our invention will appear as the description to follow proceeds, it being understood that the particular embodiment herein disclosed is merely illustrative of the invention.

For example, should we obtain an ore containing zinc minerals in any of the forms above specified and contaminated by barium sulfate, barite, barytes, etc., in such proportions as to preclude the making of a zinc concentrate salable to smelters, we should proceed as follows:—

The ore would first be put through well known mechanical processes, after having been crushed, as is usual, and so separated from its worthless gangue by devices well known in the art, such as jigs, concentrating tables, classifiers, etc. By separating in so far as possible the zinc and barium minerals from the worthless gangue in this way, we should obtain a concentrate for the most part consisting of zinc minerals and barium sulfate, or barite, barytes, etc., with a residue of probably not more than eight (8) per cent. of worthless gangue, in general consisting of iron and silica minerals. By way of illustration, a concentrate might contain 54% zinc sulfid, 40% barium sulfate and 6% valueless gangue of the character just described, which would have been pulverized in the mechanical separating process above referred to so as to pass a 60-mesh or other suitable screen. This mass would then be put through an oxidizing roast at a temperature too high to permit the formation of zinc sulfates, but which would transform the zinc sulfid present into zinc oxid. The oxidizing roast should be continued until one molecule of zinc oxid is present for each molecule of barium sulfate, for a purpose which will appear later. The temperature in the oxidizing furnace is subsequently lowered until the zinc oxid cannot be appreciably reduced by the action of carbon in any of its reducing forms, to-wit, in the neighborhood of 850 degrees centigrade. At this temperature, reducing agents, such as carbon in the form of coke, coal, bitumen, gas, water, etc., are well mixed and mingled with the mass, the roast being continued at the temperature above mentioned, whereby it is transformed from an oxidizing roast for the zinc to a reducing roast for barium sulfate, the result being the transformation of the barium sulfate to barium sulfid, as will be easily understood. The mass thus prepared and comprising essentially zinc sulfid, zinc oxid and barium sulfid, is next placed in leaching tanks, with suitable filter bottoms, and lixiviated with water, heated if necessary. The barium sulfid, being soluble in water, immediately goes into solution, and by reason of the mixture of the mass, it is immediately acted upon by the zinc oxid and transformed into the more soluble compound, barium hydrate, it being remembered that the quantity of zinc oxid obtained by the oxidizing roast was made to be sufficient to transform all of the barium sulfid into barium hydroxid. The solution containing barium hydrate is refrigerated to room temperature, or lower, whereupon most of the barium hydrate crystallizes out and may be removed by any well-known means, this product having a great commercial value in the arts and being readily salable. The filtrate containing small quantity of barium hydrate may be used again in the leaching process.

The leached ore, consisting of zinc minerals, some unreduced barite, carbon, and the gangue above specified, is now by reason of the previous treatment in a condition to be further treated, by ordinary mechanical processes whereby a further portion of the gangue is removed and an enriched zinc product obtained.

In order to completely explain our new process, we have selected for illustrative purposes the treatment of an ore containing zinc sulfid, this requiring more elaborate treatment than other forms of zinc. If the zinc present in the ore were zinc oxid or carbonate contaminated with barium sulfate, the oxidizing roast would of course be unnecessary, inasmuch as the zinc would be in the condition into which, as we have explained, we transform zinc sulfid. In this contingency, the ore would be treated directly without an oxidizing roast, by the reducing process above explained.

We also contemplate the mixing of various ores, particularly the mixing of zinc carbonate ores with zinc sulfid ores, and a supply of carbon for the purpose of reducing the barium sulfate, the aim always being to maintain in the completed roast one molecule of zinc oxid to each molecule of reduced barium sulfate or barium sulfid, the object of this being to permit the reaction between the zinc oxid and barium sulfid, which transforms the barium sulfid into barium hydrate and permits it to be leached away from the mass of ore as above explained.

In the operation of this process it may be found convenient to carry out certain portions of the entire process in separate furnaces such as for instance, to roast the zinc sulfid which has been obtained as a result of the process and is free from barium in a separate oxidizing furnace in order to obtain the zinc oxid, and at the same time to reduce the barium sulfate in a mass of unseparated ore by reducing agents in another furnace, and to thereafter mingle the resulting zinc oxid and the reduced ore in common leaching tanks. If the process is carried on in this way, the material should be well mixed, and it must be carefully calculated, so that one molecule of zinc oxid must be present for each molecule of barium sulfid, or substantially that proportion, to permit the reaction between the zinc oxid and barium sulfid above described, whereby is obtained zinc sulfid on the one hand and barium hydrate on the other, as above explained.

Having now described our invention, we claim:—

1. The method of treating zinc ores contaminated with barium products which consists in rendering the barium products soluble and leaching away the same, substantially as described.

2. The method of treating zinc ores contaminated by a substantial quantity of barium sulfate which consists in reducing the barium sulfate to barium sulfid, causing the mass to contain equivalent quantities of zinc oxid and barium sulfid whereby the barium sulfid may be completely transformed into barium hydrate and may be readily leached out.

3. The method of treating zinc ores contaminated with barium sulfate which consists in concentrating said ores to obtain concentrated zinc compounds and barium sulfate substantially free from gangue, in thereafter oxidizing said concentrate if necessary until zinc oxid is present in equivalence to the barium sulfate in reducing the barium sulfate to barium sulfid without reducing the zinc oxid in causing the barium sulfid and zinc oxid to react to produce barium hydrate and in leaching out the barium hydrate substantially as described.

4. The method of obtaining zinc sulfid from zinc ore contaminated with barytes, by producing reaction between zinc oxid and reduced barium sulfate in the form of barium sulfid.

5. The method of obtaining barium hydrate, from zinc ores contaminated with barytes, by producing the reaction between zinc oxid and reduced barium sulfate in the form of barium sulfid, and leached out from the mixed ores.

6. The method of treating zinc ores contaminated with a mechanically inseparable barium product which consists in treating said ores until zinc oxid is present in equivalent quantities to the barium in the form of barium sulfid, in thereafter causing the zinc oxid and barium sulfid to react to produce barium hydrate and in separating out the barium hydrate.

In witness whereof, we have hereunto subscribed our names to this specification in the presence of two witnesses.

GEORGE T. WRIGHT.

Witnesses:
P. M. RITCHIE,
OLLIE ETTER.

LAURENCE C. HODSON.

Witnesses:
JAS. H. JAMESON,
A. D. STRUTHERS.